(12) United States Patent
Lau et al.

(10) Patent No.: US 9,337,703 B2
(45) Date of Patent: May 10, 2016

(54) THRUST BEARING ASSEMBLY (75) Inventors: James Ching Sik Lau, Hong Kong (CN); Duncan Yiu Lung Wong, Hong Kong (CN); Yuen Tung Louie, Hong Kong (CN)

(73) Assignee: JOHNSON ELECTRIC S.A., Murten (CH)

(*) Notice: Subject to any disclaimer, the term of this patent is extended or adjusted under 35 U.S.C. 154(b) by 764 days.

(21) Appl. No.: 13/491,043

(22) Filed: Jun. 7, 2012

(65) Prior Publication Data
US 2012/0313471 A1  Dec. 13, 2012

(30) Foreign Application Priority Data
Jun. 8, 2011 (CN) .......................... 2011 1 0156224

(51) Int. Cl.
| H02K 7/00 | (2006.01) |
| H02K 7/08 | (2006.01) |
| F16C 17/04 | (2006.01) |
| F16C 33/10 | (2006.01) |
| F16C 17/08 | (2006.01) |

(52) U.S. Cl.
CPC .............. H02K 7/083 (2013.01); F16C 17/045 (2013.01); F16C 17/08 (2013.01); F16C 33/103 (2013.01); F16C 33/1085 (2013.01); F16C 2380/26 (2013.01)

(58) Field of Classification Search
CPC ....... H02K 7/083; F16C 17/08; F16C 33/103; F16C 33/1085; F16C 17/045; F16C 2380/26
USPC .............................. 310/90; 384/279, 322, 132
See application file for complete search history.

(56) References Cited

U.S. PATENT DOCUMENTS

| 4,910,788 | A | * | 3/1990 | Shimizu | ................ | F16C 23/045 384/192 |
| 5,080,378 | A | * | 1/1992 | Kagawa | ................ | C04B 35/565 277/404 |
| 5,145,266 | A | * | 9/1992 | Saneshige | ............. | F16C 33/103 384/132 |
| 6,547,439 | B2 | * | 4/2003 | Chen | ..................... | F16C 33/103 384/114 |
| 2002/0067089 | A1 | * | 6/2002 | Ichiyama | .............. | F16C 17/105 310/90 |
| 2006/0269179 | A1 | * | 11/2006 | Miyasaka | ............. | F16C 33/103 384/279 |

* cited by examiner

*Primary Examiner* — Joshua Benitez-Rosario
*Assistant Examiner* — Leda Pham
(74) *Attorney, Agent, or Firm* — Muncy, Geissler, Olds & Lowe, P.C.

(57) ABSTRACT

A thrust bearing assembly for supporting an end surface against an axial load, includes a first part with a chamber; a second part disposed in the chamber and having a load surface facing the end surface; and a third part fixed with the first part and spaced from the second part. A reservoir for storing lubricant is formed in the chamber between the second part and third part. A narrow passage communicates the reservoir with the load surface to allow the lubricant to flow from the reservoir to the load surface to lubricate the interface between the load surface and the end surface when the axial load rotates.

20 Claims, 7 Drawing Sheets

THRUST BEARING ASSEMBLY

CROSS REFERENCE TO RELATED APPLICATIONS

This non-provisional patent application claims priority under 35 U.S.C. §119(a) from Patent Application No. 201110156224.8 filed in The People's Republic of China on Jun. 8, 2011.

FIELD OF THE INVENTION

This invention relates to a thrust bearing assembly and to a motor using a thrust load bearing.

BACKGROUND OF THE INVENTION

A known electric motor has a stator and a rotor rotatable relative to the stator. The rotor has a shaft. Optionally a spacer is fixed to the shaft. The shaft is rotatably supported against axial moment in one direction by a thrust bearing which is fixed to the stator. The thrust bearing is located confronting either an end of the shaft or the spacer in order to limit axial movement of the shaft. Known thrust bearings may be self lubricated. These are usually oil impregnated sintered parts. In use the oil from the thrust bearing is not well controlled leading to oil migration and thus the oil in the bearing is quickly depleted, leading to loss of lubrication, rapid wear of the contacting parts and failure of the motor.

Hence there is a desire for a thrust bearing that controls the flow of lubricant or at least provides a greater amount of lubricant.

SUMMARY OF THE INVENTION

Accordingly, in one aspect thereof, the present invention provides a thrust bearing assembly for supporting a rotatable shaft against an axial load, the shaft being associated with an end surface arranged to bear against the thrust bearing assembly, the thrust bearing assembly comprising: a first part defining a chamber; a second part disposed in the chamber; a third part fixed with the first part and spaced from the second part; a load surface arrange to face the end surface, the load surface being formed by at least one of the second part and the third part; a reservoir, for accommodating lubricant, formed in the chamber between the second part and the third part; and a passage communicating the reservoir with the load surface to allow the lubricant to flow from the reservoir to the load surface, wherein the first, second and third parts are made of material with low porosity.

Preferably, the reservoir is axially formed between the second part and the third part.

Optionally, the reservoir has a rectangular cross section.

Optionally, the axial size of the reservoir increases in a radial direction away from the passage.

Optionally, at least one of two facing surfaces of the second and third parts is inclined relative to an axis of the shaft.

Preferably, the third part is disposed in the chamber, the third part and the second part forming the load surface.

Preferably, the third part is integrally formed with the first part, as monolithic construction.

Preferably, the second part defines a through hole and the shaft extends through the through hole, the shaft being rotatable with respect to the second part and a spacer is fixed to the shaft, the spacer defining the end surface.

Preferably, an inner surface of the through hole of the second part is arc shaped such that opposite axial ends of the inner surface are spaced from the shaft.

Preferably, the passage is formed at an interface between the second part and third part.

Preferably, the passage is formed by a plurality of axial grooves formed in an inner circumferential surface of the third part that is fitted to a circumferential surface of the second part.

Preferably, a plurality of tapered grooves are formed in the load surface of the third part, each tapered groove being joined to a respective axial groove and tapers in a radial and circumferential direction away from the axial groove.

Alternatively, the passage is formed by a plurality of axial grooves formed in a circumferential surface of the second part that is fitted to an inner circumferential surface of the third part.

Optionally, the passage is formed by an annular gap between the second part and the third part.

Alternatively, the passage is formed by a plurality of axially extending holes formed in the third part.

Preferably, the third part has an axially extending annular inner flange that bears in an axial direction against a step formed on the second part.

Preferably, the first, second and third parts are made of material with porosity less than 13%.

According to a second aspect thereof, the present invention also provides an electric motor comprising: a stator, a rotor, and the thrust bearing assembly, defined above, fixed to the stator, wherein the rotor comprises the rotatable shaft and a spacer fixed to the shaft, the spacer defining the end surface facing the load surface of the thrust bearing assembly to support the shaft against axial loads bringing the spacer into contact with the thrust bearing assembly, thereby limiting axial movement of the shaft in one direction.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
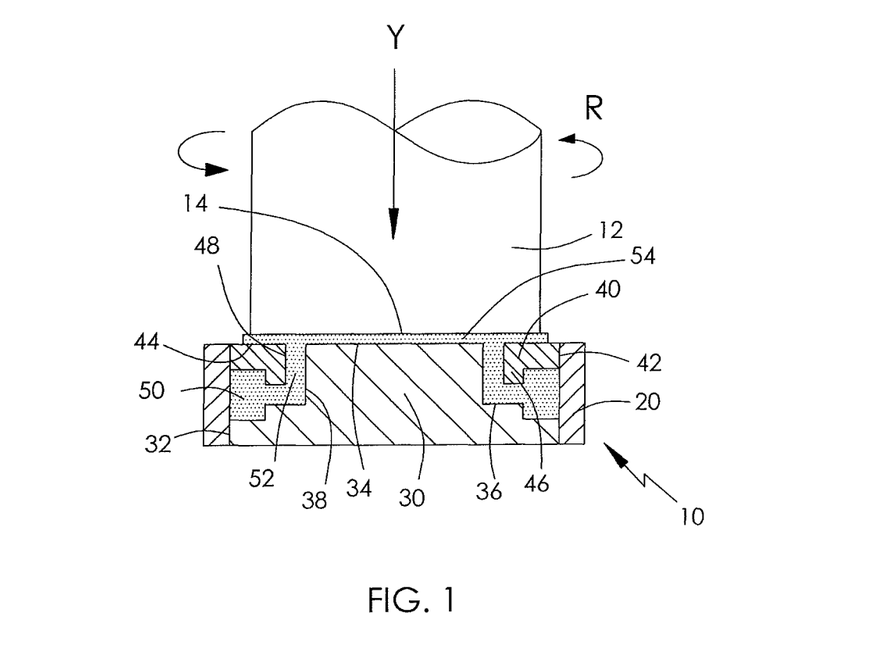
FIG. 1 illustrates an axial load and a thrust bearing assembly in a working state, in accordance with a first preferred embodiment of the present invention.

FIG. 1 illustrates a thrust bearing assembly 10 for an axial load 12 according to a first preferred embodiment of the present invention. The axial load 12 may be a rotatable shaft 16 or a washer or spacer 18 fixed to the shaft, which is being pressed in an axial direction into contact with the thrust bearing assembly. The axial load 12 has an end surface 14 which is preferably perpendicular to the pushing direction Y of the axial load 12. The axial load is applied to a load surface of the thrust bearing assembly through the shaft and/or spacer. The end surface 14 is a associated with the shaft by for example being an end of the shaft, being a step formed on the shaft or being a surface of a spacer fixed to the shaft. The purpose of the end surface is to bear against the thrust bearing to limit the axial movement of the shaft in one direction.

The thrust bearing assembly 10 comprises a first part 20, a second part 30 and a third part 40 all of which are preferably made of material with low porosity, that is, a porosity of 15% or less. Preferably, the first part 20, second part 30 and third part 40 are made of sintered material with porosity less than 13%. In the embodiment of FIG. 1, the first part 20 is a hollow tube defining an axial direction parallel to the pushing direction Y of the axial load 12. The first part 20 has a chamber formed therein. The second part 30 is a solid part which is received in the chamber of the first part 20. The second part 30 comprises a mounting section 32 remote from the axial load 12. The mounting section 32 is fixedly attached to the inner surface of the first part 20. The second part 30 comprises a load surface 34 for contacting with the end surface 14 of the axial load 12 to thereby limit axial movement of the shaft 16. In this illustration, the end surface is the axial end of the shaft. The second part 30 comprises a step 36 formed between the load surface 34 and the mounting section 32. The third part 40, received in the chamber of the first part 20, comprises a mounting section 42 fixedly mounted to the inner surface of the first part 20. The mounting section 42 of the third part 40 faces the mounting section 32 of the second part 30 and is axially spaced from the mounting section 32.

An annular reservoir 50 having a rectangular cross section is formed between the inner surface of the first part 20 and the mounting sections 32, 42. The third part 40 defines an axial through hole surrounded by a circumferential inner surface 48. A portion of the second part 30 remote from the mounting section 32 extends through the through hole of the third part 40. The inner surface 48 of the third part 40 is radially spaced from the outer surface 38 of the portion of the second part 30. The third part 40 has a load surface 44 which is preferably coplanar with the load surface 34 of the second part 30 and a step 46 facing the step 36 of the second part 30. The load surface 44 of the third part 40 is radially spaced from the load surface 34 of the second part 30 while the step 46 is axially spaced from the step 36. A narrow passage 52 is thus formed between the steps 36, 46 and the surfaces 38, 48. The passage 52 communicates the reservoir 50 with the load surfaces 34, 44. Lubricant with low viscosity such as oil or lubricant with high viscosity such as grease or solid lubricant may be stored in the reservoir 50. In use, as the thrust bearing assembly heats up, the lubricant 54 also heats up and due to thermal expansion is expelled from the reservoir through the passage 52 to lubricate the interface between the end surface 14 of the axial load and the load surfaces 34, 44.

When the axial load 12 is rotating, for example in a direction R, heat is generated due to friction between the end surface 14 of the axial load 12 and the load surfaces 34, 44 of the thrust bearing assembly 10. Lubricant 54 stored in the reservoir 50 is heated and undergoes thermal expansion. The flowability of the lubricant increases as the temperature of the lubricant increases. The lubricant may flow due to the thermal expansion forcing the lubricant out of the reservoir via the passage 52 or due to surface tension, etc. The lubricant flows out of the reservoir 50 via the passage 52 to the area or space formed between the end surface 14 and the load surfaces 34, 44. Thus, a layer of lubricant is formed between the end surface 14 and the load surfaces 34, 44 to thereby greatly reduce friction between the end surface 14 and the load surfaces 34, 44. When the axial load 12 stops rotating, lubricant will return to the reservoir 50 via the passage 52.

Figure 2A:
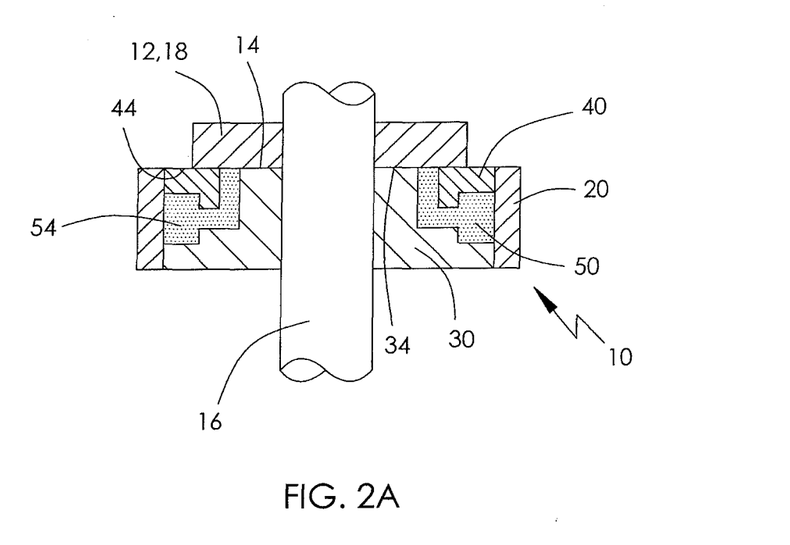
FIG. 2A illustrates an axial load and a thrust bearing assembly in a non-working state, in accordance with a second preferred embodiment of the present invention.
Figure 2B:
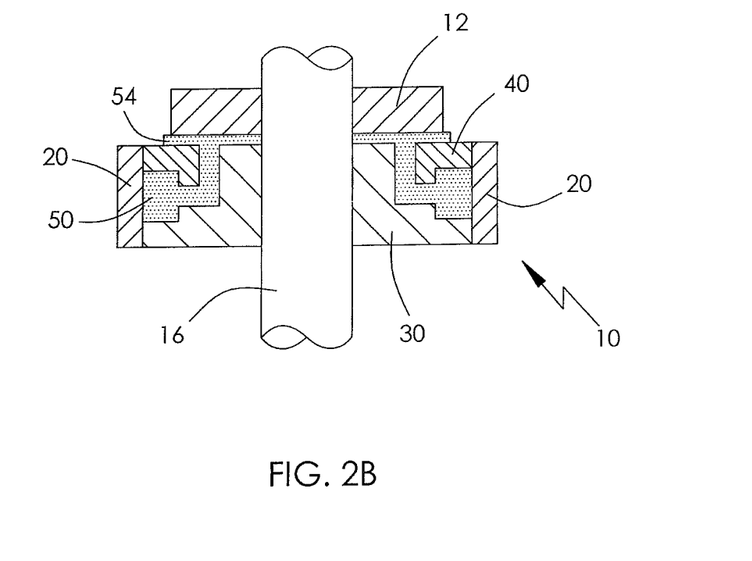
FIG. 2B illustrates the thrust bearing assembly of FIG. 2A in a working state.

FIGS. 2A and 2B illustrate a thrust bearing assembly 10 for an axial load 12 according to a second preferred embodiment of the present invention. FIG. 2A illustrates the thrust bearing assembly 10 in a stationary state while FIG. 2B illustrates the thrust bearing assembly 10 in a rotating state. In this embodiment, the thrust bearing assembly 10 is used as a thrust bearing and as a radial bearing with the second part 30 defining a through hole 31 in which the shaft 16 is journalled or rotatably mounted. A spacer 18 is fixed on and rotatable with the shaft 16. The spacer represents the axial load and defines the end surface 14.

Figure 3:
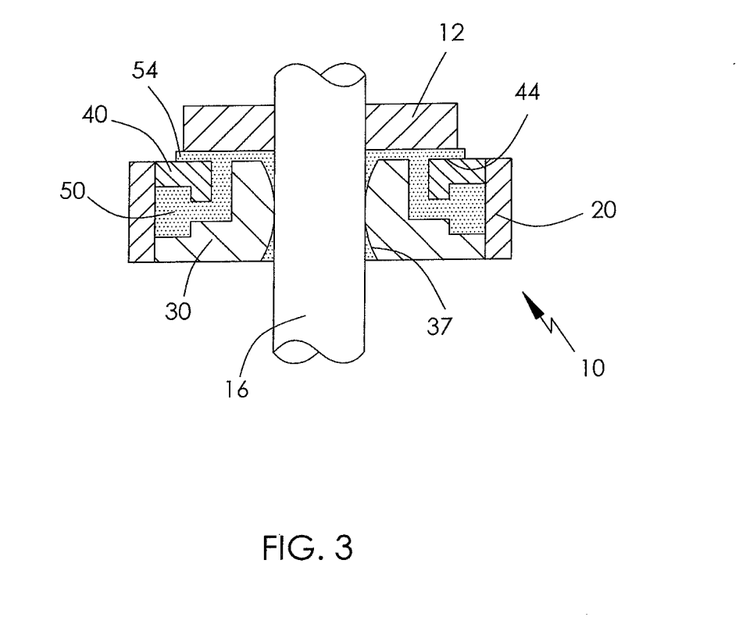
FIG. 3 illustrates an axial load and a thrust bearing assembly in a working state, in accordance with a third preferred embodiment of the present invention.

FIG. 3 illustrates a thrust bearing assembly 10 for an axial load 12 according to a third preferred embodiment of the present invention. The thrust bearing assembly 10 is similar to the thrust bearing assembly 10 of the second embodiment except the inner surface 37 of the through hole of the second part 30 surrounding the shaft 16 is arc shaped. The inner surface 37 is arc shaped such that opposite axial ends of the inner surface 37 are radially spaced from the shaft 16. Thus, lubricant 54 can flow from the area formed between the end surface 14 of the axial load 12 and the load surfaces 34, 44 to the space formed between the inner surface 37 of the second part 30 and the shaft 16 to thereby reduce friction between the shaft 16 and second part 30.

Figure 6:
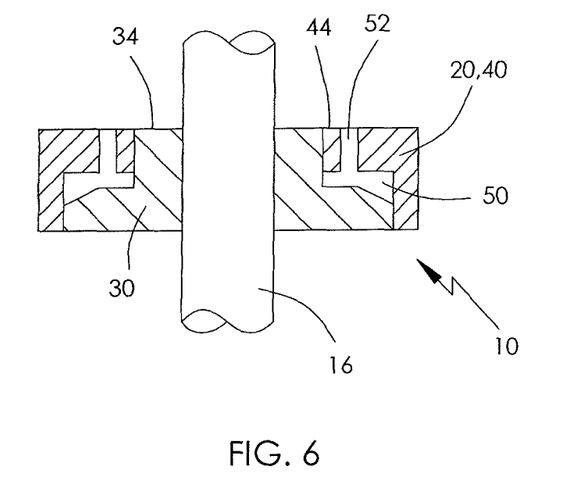
FIG. 6 illustrates a thrust bearing assembly in a working state, in accordance with a six preferred embodiment of the present invention.
Figure 7:
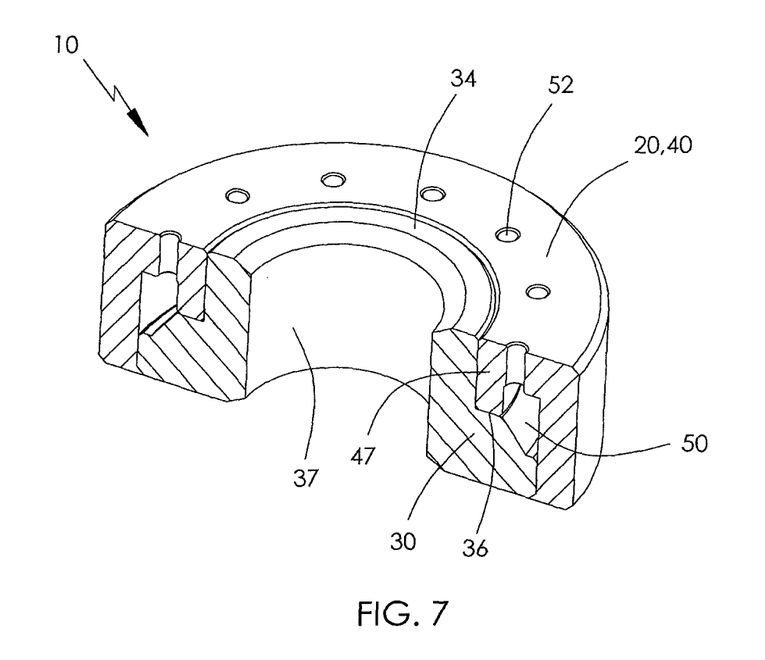
FIG. 7 illustrates a thrust bearing assembly according to a seventh preferred embodiment of the present invention.

In an alternative construction, the inner surface 48 of the third part 40 may make direct contact with the outer surface 38 of the second part 30. This construction is shown in the embodiments of FIG. 4A to FIG. 7. In this arrangement the passage 52 is formed by a plurality of circumferentially spaced holes. These holes may be formed in the second part 30 or the third part 40, as shown in FIGS. 6 & 7. Preferably, the holes are produced by forming axially extending grooves in one or both of the outer surface 38 and the inner surface 48. The passage 52 being formed by grooves in the inner surface 48 of the third part 40 is shown in FIGS. 4B, 5B & 5D. The passage 52 being formed by grooves in the outer surface 48 of the second part 30 is shown in FIG. 5C.

Figure 4A:
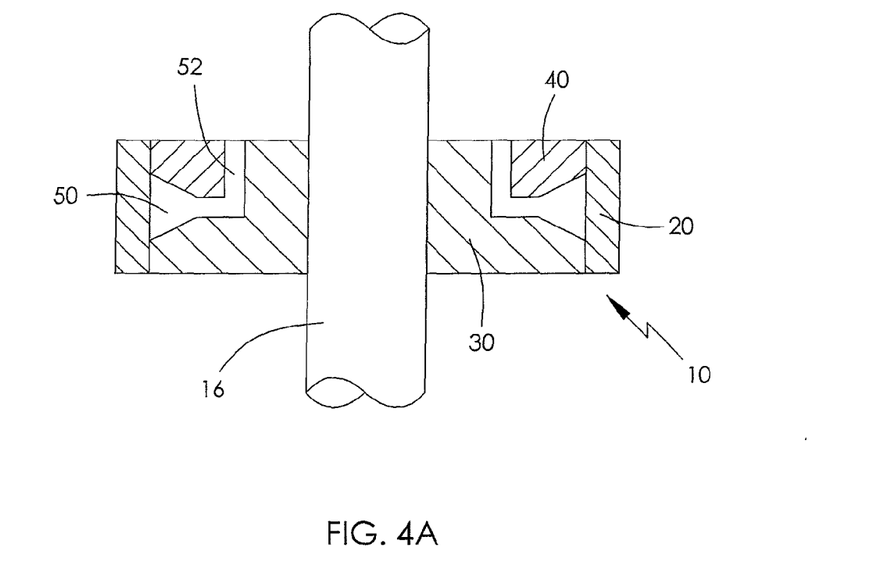
FIGS. 4A and 4B illustrate a thrust bearing assembly according to a fourth preferred embodiment of the present invention.
Figure 4B:
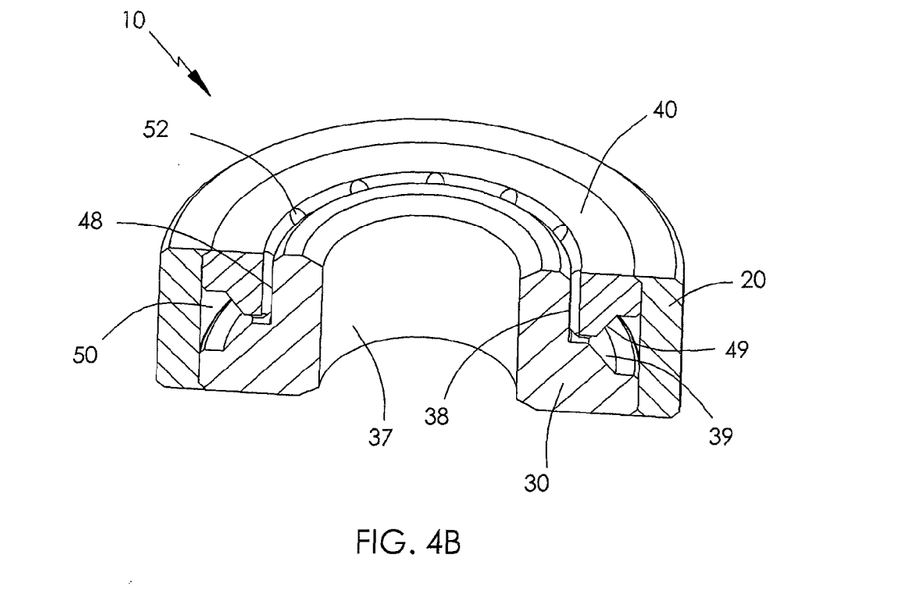

FIGS. 4A and 4B illustrate a thrust bearing assembly 10 for an axial load according to a fourth preferred embodiment of the present invention. This embodiment is similar to the thrust bearing assembly of the second embodiment except that two facing surfaces 39, 49 of the second and third parts 30, 40 are inclined such that the axial depth of the reservoir 50 is gradually increased in a radial direction away from the passages 52. It can be seen in FIG. 4B that the passage 52 is formed by a plurality of grooves formed in the inner circumferential surface 48 of the third part 40. Also, as the step 46 of the third part may sit on the step 36 of the second part, the grooves may extend through the step 46 so as to connect to the reservoir 50.

Figure 5A:
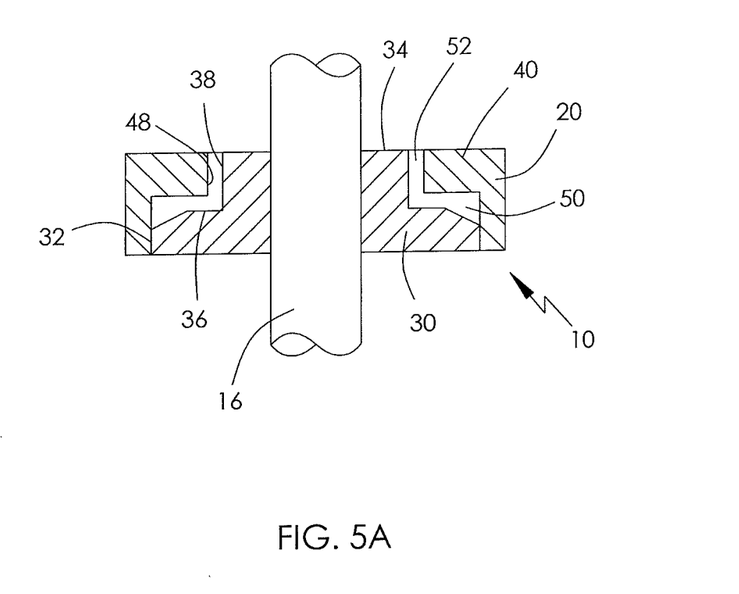
FIGS. 5A and 5B illustrate a thrust bearing assembly according to a fifth preferred embodiment of the present invention.
Figure 5B:
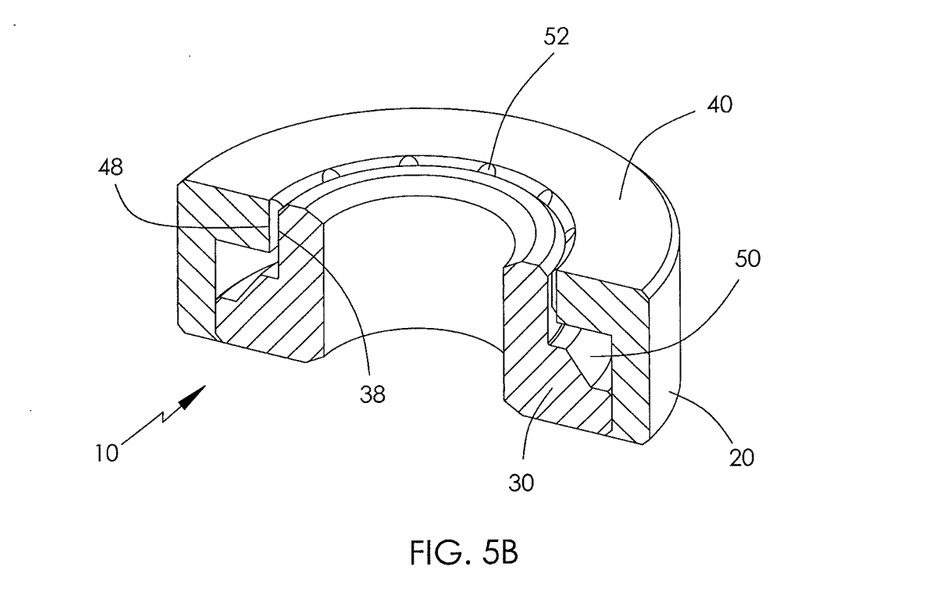

FIGS. 5A and 5B illustrate a thrust bearing assembly 10 for an axial load according to a fifth preferred embodiment of the present invention. In this embodiment the third part 40 is integrally formed with the first part 20, as a monolithic construction, and the reservoir 50 has a generally triangular cross section. In this embodiment, the surface of the mounting section 32 of the second part 30 facing the third part 40 is inclined such that the axial depth of the reservoir 50 is gradually increased in a radial direction away from the passage 52. The inner surface 48 of the third part 40 is located close to or contacts with the outer surface 38 of the second part 30. The passage 52 is formed at the interface between the inner surface 48 of the third part 40 and the outer surface 38 of the second part 30. In FIG. 5B the passage 52 is formed by a plurality of circumferentially spaced axially extending grooves in the inner surface 48 of the third part 40.

Figure 5C:
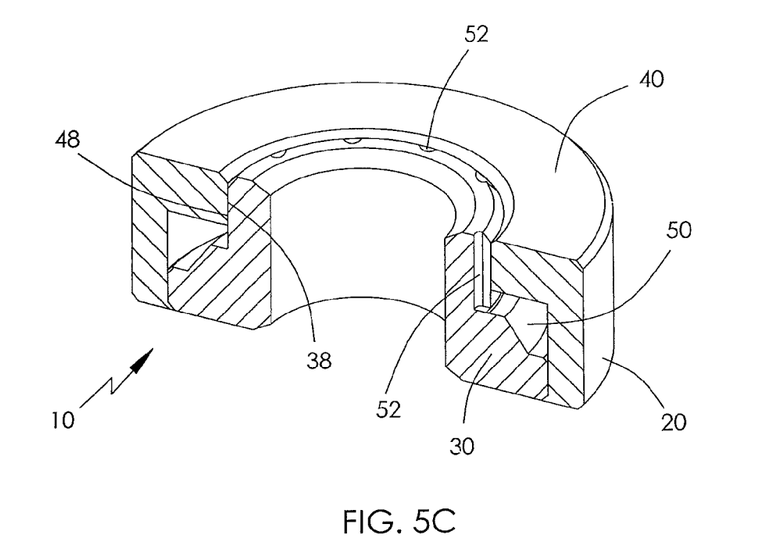
FIG. 5C illustrates a modification to the thrust bearing assembly of FIG. 5B.
Figure 5D:
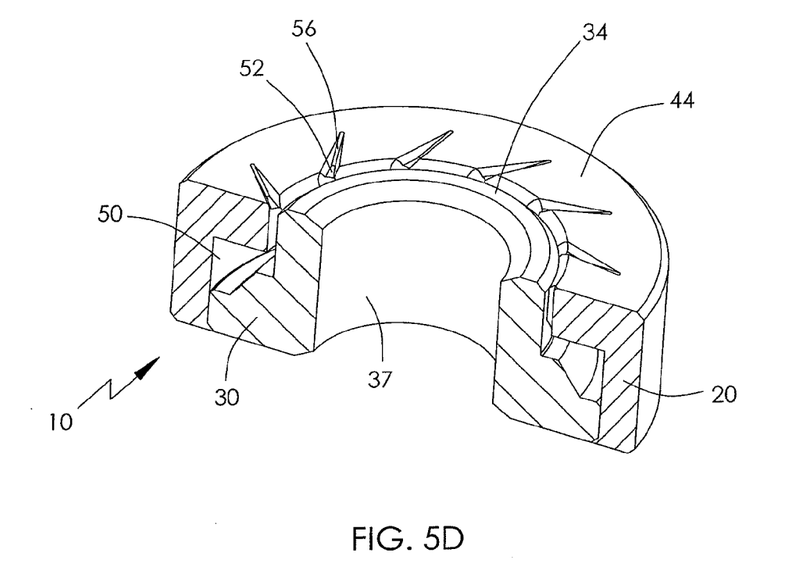
FIG. 5D illustrates a further modification to the thrust bearing assembly of FIG. 5B.

FIG. 5C illustrates a modified thrust bearing assembly 10 which is similar to the thrust bearing assembly of FIG. 5B except that the passage 52 is formed at the interface between the second and third parts by a plurality of circumferentially spaced axially extending grooves in the peripheral surface 38 of the second part 30.

FIG. 5D illustrates a further modification of the thrust bearing assembly 10 of FIG. 5B in which grooves 56 are formed in the load surface 44 of the third part 40. Each groove 54 has a proximal end joining with a respective passage 52, and a distal end remote from the passage 52. Ideally, each groove 56 has a gradually reduced width and/or depth in a direction from the proximal end to the distal end such that a higher pressure can be generated at the distal end to thereby push the axial load 12 away from the load surface 34, 44 of the thrust bearing assembly 10 when the axial load 12 is rotating.

FIG. 6 illustrates a thrust bearing assembly 10 for an axial load according to a sixth preferred embodiment of the present invention. In this embodiment the passage 52 is not formed at the interface between the second and third parts. Instead, the passage 52 is formed by a plurality of holes formed in the third part 40 radially spaced from the inner surface of the third part 40. Ideally, when the third part forms the load surface or a part of the load surface, the holes are formed in the load surface of the third part to lead the lubricant directly to the load surface.

FIG. 7 illustrates a thrust bearing assembly 10 for an axial load according to a seventh preferred embodiment of the present invention. This embodiment is similar to the thrust bearing assembly of FIG. 6 except the third part 40 further comprises an inner flange 47 axially extending from the inner edge thereof. Thus the inner flange forms an annular wall which is fitted to the circumferential surface 38 of the second part. The inner flange 47 axially contacts the step 36 of the second part 30 in order to prevent the third part 40 from being deformed when the axial load 12 presses against the third part 40.

Figure 8:
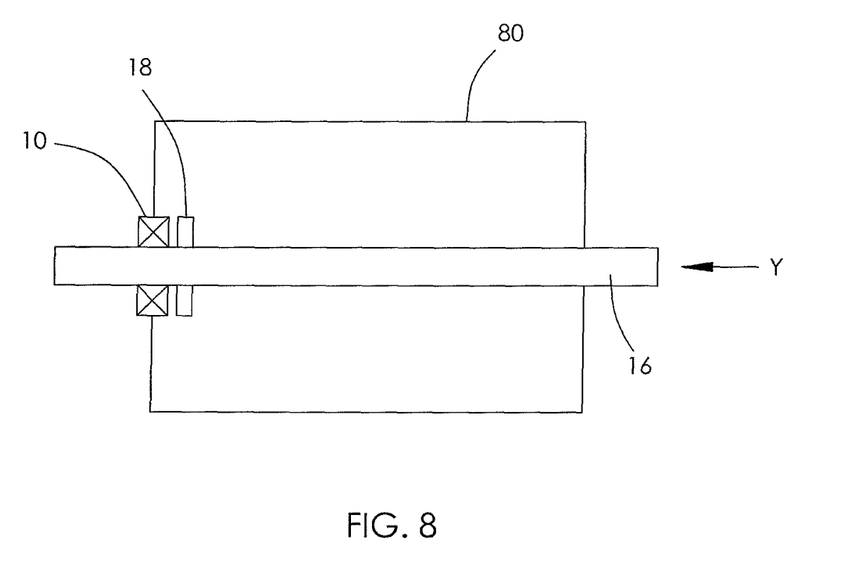
FIG. 8 illustrates an electric motor incorporating a thrust bearing assembly according to the present invention.

FIG. 8 illustrates in schematic form, an electric motor 80 having a stator to which the thrust bearing assembly is fixed, and a rotor, including a shaft 16 and a spacer 18 fixed to the shaft. The end surface of the spacer confronts the load surface of the thrust bearing assembly across a small air gap in the relaxed state. When an axial load is applied to the shaft in the direction Y, the shaft is moved axially until the end surface bears against the load surface, preventing further axial movement of the shaft in the direction Y.

While the thrust bearing assembly is shown interacting with the spacer fixed to the shaft and also radially supporting the shaft, the shaft may be supported by separate radial bearings such as sleeve bearings and the thrust bearing assembly arranged to make direct contact with an end of the shaft.

In the description and claims of the present application, each of the verbs "comprise", "include", "contain" and "have", and variations thereof, are used in an inclusive sense, to specify the presence of the stated item but not to exclude the presence of additional items.

Although the invention is described with reference to one or more preferred embodiments, it should be appreciated by those skilled in the art that various modifications are possible. Therefore, the scope of the invention is to be determined by reference to the claims that follow.

Further more, the load surface 34 of the second part 30 and the load surface 44 of the third part 40 may not be coplanar with each other. For example, the load surface 44 of the third part 40 may be recessed relative to the load surface 34 of the second part 30.

Also, it should be realized that the various features of the embodiments shown are not the only combinations possible and other embodiments may be formed by using different combinations of the optional features.

The invention claimed is:

1. A thrust bearing assembly for supporting a rotatable shaft against an axial load, the shaft being associated with an end surface arranged to bear against the thrust bearing assembly, the thrust bearing assembly comprising:
   a first part defining a chamber, the first part being cylindrical and having an inner surface;
   a second part entirely disposed inside the chamber, the second part contacting the inner surface of the first part;
   a third part fixed with the inner surface of the first part and spaced from the second part;
   a load surface arrange to face the end surface, the load surface being formed by at least one of the second part and the third part;
   a reservoir, for accommodating lubricant, formed in the chamber between the second part and the third part, the reservoir being formed and enclosed by the inner surface of the first part, the second part and the third part; and
   a passage formed between the second and third parts and communicating having a first end directly connected to the reservoir and a second end directly connected to the load surface to allow the lubricant to flow from the reservoir to the load surface,
   wherein the first, second and third parts are made of material with low porosity, and
   wherein the passage has an L-shape in a cross section.

2. The assembly of claim 1, wherein the reservoir is axially formed between the second part and the third part.

3. The assembly of claim 2, wherein the reservoir has a rectangular cross section.

4. The assembly of claim 2, wherein the axial size of the reservoir increases in a radial direction away from the passage.

5. The assembly of claim 4, wherein at least one of two facing surfaces of the second and third parts is inclined relative to an axis of the shaft.

6. The assembly of claim 1, wherein the third part is disposed in the chamber, the third part and the second part forming the load surface.

7. The assembly of claim 1, wherein the third part is integrally formed with the first part, as monolithic construction.

8. The assembly of claim 1, wherein the second part defines a through hole and the shaft extends through the through hole, the shaft being rotatable with respect to the second part and a spacer is fixed to the shaft, the spacer defining the end surface.

9. The assembly of claim 8, wherein an inner surface of the through hole of the second part is arc shaped such that opposite axial ends of the inner surface are spaced from the shaft.

10. The assembly of claim 1, wherein the passage is formed at an interface between the second part and third part.

11. The assembly of claim 10, wherein the passage is formed by an annular gap between the second part and the third part.

12. The assembly of claim 10, wherein the passage is formed by a plurality of axial grooves formed in an inner circumferential surface of the third part that is fitted to a circumferential surface of the second part.

13. The assembly of claim 12, wherein a plurality of tapered grooves are formed in the load surface of the third part, each tapered groove being joined to a respective axial groove and tapers in a radial and circumferential direction away from the axial groove.

14. The assembly of claim 10, wherein the passage is formed by a plurality of axial grooves formed in a circumferential surface of the second part that is fitted to an inner circumferential surface of the third part.

15. The assembly of claim 1, wherein the passage is formed by a plurality of axially extending holes formed in the third part.

16. The assembly of claim 1, wherein the third part has an axially extending annular inner flange that bears in an axial direction against a step formed on the second part.

17. The assembly of claim 1, wherein the third part is made of material with porosity less than 13%.

18. An electric motor comprising: a stator, a rotor, and the thrust bearing assembly of claim 1 fixed to the stator, wherein the rotor comprises the rotatable shaft and a spacer fixed to the shaft, the spacer defining the end surface facing the load surface of the thrust bearing assembly to support the shaft against axial loads bringing the spacer into contact with the thrust bearing assembly, thereby limiting axial movement of the shaft in one direction.

19. The motor of claim 18, wherein the second part defines a through hole and the shaft extends through the through hole, the shaft being rotatable with respect to the second part.

20. The motor of claim 19, wherein an inner surface of the through hole of the second part is arc shaped such that opposite axial ends of the inner surface are spaced from the shaft.

\* \* \* \* \*